Sept. 3, 1929. S. A. CLEMETSON 1,726,693
SCREW DRIVER CHUCK
Filed Aug. 7, 1928
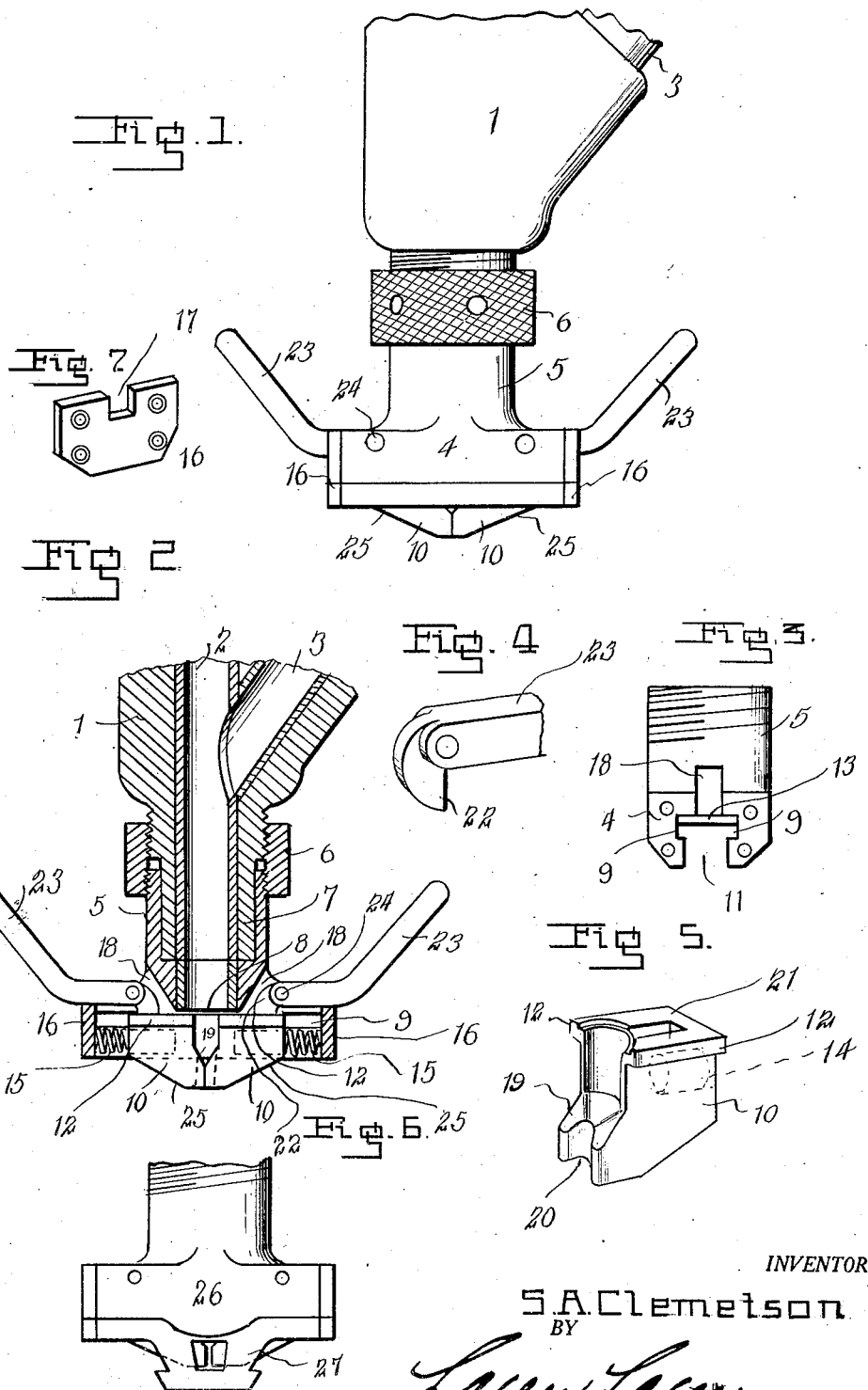
INVENTOR.
S. A. Clemetson
BY
Lacey & Lacey
ATTORNEYS Patented Sept. 3, 1929.

1,726,693

UNITED STATES PATENT OFFICE.

SELMER A. CLEMETSON, OF IRON MOUNTAIN, MICHIGAN, ASSIGNOR TO THE LOCK-LITE COMPANY, OF IRON MOUNTAIN, MICHIGAN, A CORPORATION OF MICHIGAN.

SCREW-DRIVER CHUCK.

Application filed August 7, 1928. Serial No. 298,034.

This invention relates to chucks for screw-driving machines and has for its object the provision of a chuck of simple construction whereby the screw to be driven will be supported in proper position upon the work and will be held upright while engaged by the screw driver in turning it home. A particular object of the invention is to provide easily operated means whereby in the event of crowding of the screws from the magazine the screws may be released so that a single screw will be supported in proper position to be engaged by the screw driver.

In the accompanying drawing:

Figure 1 is an elevation of a chuck embodying the invention;

Fig. 2 is a vertical section taken longitudinally of the head;

Fig. 3 is a detail end view of the head;

Fig. 4 is a detail view of the end of a releasing lever;

Fig. 5 is an enlarged detail perspective view of one of the jaws;

Fig. 6 is an elevation of another form of head, and

Fig. 7 is a detail perspective view of a cap which is applied to the ends of the head.

In the drawing, the reference numeral 1 indicates a body having a central vertical bore, indicated at 2, and carrying on one side a screw supply tube 3 which leads from a magazine. These parts may be of any well-known construction and the magazine is, of course, supplied with the usual feed-controlling elements whereby the screws are permitted to pass one at a time to the chuck. The screw driver passes downwardly through the bore 2 of the upright body to engage a screw supported below and in alinement with said bore.

The head of my chuck comprises a somewhat elongated base member 4 from which rises centrally a hollow post 5 externally threaded at its upper end whereby it may be engaged by a coupling collar or nut 6 to be secured to the lower end of the body 1, as shown in Figs. 1 and 2, it being noted that the lower end of the body is reduced to provide a nozzle 7 fitting within the hollow post 5 so that a continuous passage for the screws will be provided free of internal projections or shoulders which are apt to catch the screws and interfere with the proper feeding of the same. The hollow post 5 terminates above the lower edge of the body 4, as shown at 8, and in the inner surfaces of the body 4 are formed grooves 9 which constitute guides for the screw-holding jaws 10. The jaws 10, as shown clearly in Fig. 5, are substantially of rectangular formation so that they will fit closely but slidably within the slot or open passage 11 formed longitudinally in the bottom of the body 4 and they are provided at their upper ends with longitudinal flanges 12 engageable in the grooves 9 to slidably support the jaws in an obvious manner. Upon reference to Fig. 3, it will be noted that the grooves 9 open through the ends of the head so that the jaws may be easily inserted in place in engagement with the grooves. To prevent rocking movement of the jaws, a shim or washer 13 may be fitted in the grooves 9 above the jaws so as to take up wear and maintain the rectilinear movement of the jaws. In the outer end of each jaw is a socket, indicated at 14, to receive an expansion spring 15 bearing at one end against the end wall of the socket and at its opposite end against an end plate 16 which is secured to the end of the head. The end plate 16 has an outline conforming to the outline of the head and bridges the end of the opening 11 in the head so as to provide an abutment for the respective expansion spring and also prevent the jaw being accidentally withdrawn from the head. In the upper edge of the end plate is a notch 17 which registers with the longitudinally extending passage or notch 18 in the end portions of the head. Each jaw at its inner end is provided with a lip or shoulder 19 forming a seat for the head of the screw and having a vertical notch or recess 20 formed therethrough to accommodate the shank of the screw, the jaws being pressed toward each other by the springs 15 so that the recesses 20 will encircle the screw, as will be understood. In the top of each jaw is a socket or opening 21 which is adapted to receive the working tongue 22 of a releasing lever 23, the lever being pivotally mounted, as at 24, within the notch 18 of the head over the jaw and the tongue 22 being of an arcuate form whereby it may enter the socket or opening 21 and work easily therein. A releasing lever is provided at each side of the device and each lever engages and operates one of the jaws.

Normally the jaws are in abutting relation, as shown in Figs. 1 and 2, under the influence of the respective springs 15. The screws are fed to the jaws in the usual manner and will drop into the recesses 20 to be supported in upright position with the screw head resting on the seats 19. The screw driver is lowered through the bore 2 to engage the screw head and turn the same home in the usual manner, the springs 15 yielding as the screw advances so that the latter may be driven fully home in the work. It will be noted that the under sides of the jaws are beveled or inclined, as shown at 25, so that they may fit between cleats if necessary on the work.

The form of jaws shown in Figs. 1 to 5 and previously described are particularly adapted for relatively short screws. To accommodate longer screws, the head 26 shown in Fig. 6 is employed, said head having a central depending extension 27 of circular form to fit around and support the screw below the jaws, but otherwise this form of the invention is the same in all respects as the first described form. In both forms, under normal operation, the jaws will support the screws in upright position and will yield as the screws are driven home. Should the feeding elements of the screw magazine for any reason fail to operate properly so that two screws should happen to reach the chuck at one time, the releasing levers 23 are rocked upwardly so that the tongues 22 thereof will rock outwardly and thereby separate the jaws to permit one screw to pass out, the other screw being caught by the jaws and held in proper position to be engaged by the screw driver. The jaws move in rectilinear paths so that they will always be at a right angle to the working position of a screw and, consequently, will engage the screw so as to efficiently maintain it in proper position to be driven home in the work.

Having thus described the invention, I claim:

A chuck for screw drivers comprising a head including spaced side portions, and a central hollow post rising therefrom to direct screws between said side portions, jaws slidably mounted between said side portions and constructed to engage and support a screw in upright position, end plates secured to and bridging the ends of the side portions of the head, expansion springs seated in the jaws and bearing at their outer ends against said end plates, and releasing levers pivotally mounted in the head above the jaws and having depending tongues operatively engaged in the tops of the jaws.

In testimony whereof I affix my signature.

SELMER A. CLEMETSON. [L. S.]